United States Patent [19]

Ohashi et al.

[11] Patent Number: 5,591,103
[45] Date of Patent: Jan. 7, 1997

[54] HYDRAULIC CONTROL CIRCUIT FOR HYDRAULICALLY OPERATED VEHICULAR TRANSMISSION

[75] Inventors: Tatsuyuki Ohashi; Tetsuya Mochizuki, both of Wako, Japan

[73] Assignee: Honda Giken Kogyo Kabushiki Kaisha, Tokyo, Japan

[21] Appl. No.: 250,382

[22] Filed: May 27, 1994

[30] Foreign Application Priority Data

Aug. 20, 1993 [JP] Japan .................... 5-206389

[51] Int. Cl.⁶ .................. F16H 59/04; F16H 59/08
[52] U.S. Cl. .................. 477/131; 477/150
[58] Field of Search .................. 477/130, 131, 477/138, 150

[56] References Cited

U.S. PATENT DOCUMENTS

| | | | |
|---|---|---|---|
| 4,776,240 | 10/1988 | Miki | 477/131 |
| 4,870,877 | 10/1989 | Hasegawa et al. | 477/130 |
| 4,942,782 | 7/1990 | Kuwayama et al. | 477/118 |
| 4,972,740 | 11/1990 | Hasegawa et al. | 477/131 X |
| 5,038,638 | 8/1991 | Hayakawa et al. | 477/131 |
| 5,111,719 | 5/1992 | Okahara | 477/150 X |
| 5,140,871 | 8/1992 | Goto et al. | 477/143 X |
| 5,269,204 | 12/1993 | Moroto et al. | 477/131 |
| 5,293,790 | 3/1994 | Ohashi et al. | 477/131 X |

FOREIGN PATENT DOCUMENTS

| | | |
|---|---|---|
| 0525724A1 | 2/1993 | European Pat. Off. |
| 63-88353 | 4/1988 | Japan . |
| 405039858 | 2/1993 | Japan ............ 477/130 |

*Primary Examiner*—Khoi Q. Ta
*Attorney, Agent, or Firm*—Armstrong, Westerman, Hattori, McLeland & Naughton

[57] ABSTRACT

A hydraulic control circuit for a hydraulically operated vehicular transmission has at least five forward transmission trains. The hydraulic control circuit is made up of three sets of first through third solenoid valves and three sets of first through third shift valves to be controlled for changeover by the three sets of solenoid valves such that each of the transmission trains is established by changeover combinations of each of the shift valves. The first shift valve controls a condition of communication between an oil supply passage which is in communication with a hydraulic oil pressure source and a first oil passage and a second oil passage which are both on a downstream side of the oil supply passage. The second shift valve controls a condition of communication between the first oil passage and a third oil passage which is on a downstream side of the first oil passage and also controls a condition of communication between the second oil passage and a fourth oil passage and a fifth oil passage which are both on a downstream side of the second oil passage. The third shift valve controls a condition of communication between the fifth oil passage and a sixth oil passage and a seventh oil passage which are both on a downstream side of the fifth oil passage.

4 Claims, 3 Drawing Sheets

HYDRAULIC CONTROL CIRCUIT FOR HYDRAULICALLY OPERATED VEHICULAR TRANSMISSION

BACKGROUND OF THE INVENTION

1. Field of the Invention

The present invention relates to a hydraulic control circuit for a hydraulically operated vehicular transmission having at least five forward transmission trains.

2. Description of Related Art

A hydraulically operated vehicular transmission is so arranged that, by using a plurality of hydraulic engaging elements (clutches and brakes), the supply of hydraulic oil to, and discharge thereof from, these hydraulic engaging elements are controlled by a plurality of shift valves so as to establish each of the transmission trains. In this case, there are provided shift valves that are smaller in number by one than the number of transmission trains. For example, in the case of five transmission trains, four shift valves are provided, i.e., 1-2 shift valve, 2-3 shift valve, 3-4 shift valve and 4-5 shift valve. These shift valves are respectively made to be capable of being changed over between the two positions of a low-speed side and a high-speed side. At the low-speed position of each shift valve, a hydraulic engaging element for the transmission train to be taken care of by each of the shift valves is connected to an oil passage which is communicated with an oil passage on an upstream side of the shift valve. At the high-speed position of each shift valve, the oil passage on the upstream side thereof is connected to an oil passage that is communicated with a shift valve on the downstream side. In this arrangement, when the 1-2 shift valve is at the low-speed position, the first-speed transmission train is established, when the 1-2 shift valve is at the high-speed position and the 2-3 shift valve is at the low-speed position, the second-speed transmission train is established, when the 1-2 shift valve and the 2-3 shift valve are at the high-speed position and the 3-4 shift valve is at the low-speed position, the third-speed transmission train is established, when the 1-2 shift valve, the 2-3 shift valve and the 3-4 shift valve are at the high-speed position and the 4-5 shift valve is at the low-speed position, the fourth-speed transmission train is established, and when all of the shift valves are at the high-speed position, the fifth-speed transmission train is established.

In order to effect an automatic transmission or speed-changing by using an electronic control circuit such as a microcomputer or the like, there is conventionally known a transmission in which the shift valves are controlled for changeover by solenoid valves to be opened or closed by the electronic control circuit. In this case, normally one solenoid valve is provided for each shift valve. However, in order to reduce the number of solenoid valves, there is also known a transmission in which four shift valves in a five-stage transmission are controlled for changeover by three solenoid valves (Japanese Published Unexamined Patent Application No. 88353/1988).

If the number of transmission trains is increased, aside from the increase in the number of hydraulic engaging elements, the number of valves is also increased, with the result that a valve block to be contained in a transmission case becomes large. Consequently, the transmission itself becomes large and its weight also increases.

As described above, if four shift valves are provided for the five-stage transmission, the increase in size of the valve block cannot be avoided even if the solenoid valves are reduced to three in number.

SUMMARY OF THE INVENTION

In view of the above points, the present invention has an object of providing a hydraulic control circuit in which a hydraulically operated transmission having five forward transmission trains or more can be made small in size and light in weight.

In order to attain the above object, the present invention is a hydraulic control circuit for a hydraulically operated vehicular transmission having at least five forward transmission trains. The hydraulic control circuit comprises three sets of first through third solenoid valves and three sets of first through third shift valves to be controlled for changeover by the three sets of solenoid valves such that each of the transmission trains is established by changeover combinations of each of the shift valves.

If the first shift valve controls a condition of communication between an oil supply passage which is in communication with a hydraulic oil pressure source and two oil passages on a downstream side of the oil supply passage, the supply and discharge of the hydraulic oil to and from two respective oil passages on the downstream side of each of the two oil passages, i.e., to and from a total of four oil passages, can be controlled by the second shift valve. It becomes thus possible to finally control the supply and discharge of the hydraulic oil to and from eight oil passages by the aid of the third shift valve. It follows that five transmission trains or more can be controlled by three shift valves.

In case of five transmission trains, first through fifth, i.e., a total of five hydraulic engaging elements become necessary. If the first hydraulic engaging element is arranged to be provided with a one-way transmission mechanism which allows for overrunning of an output side, there will be no problem even if the first hydraulic engaging element is kept constantly engaged. The first hydraulic engaging element can therefore be connected to oil supply passages without passing through the shift valves, and the oil supply and discharge only to and from the remaining four hydraulic engaging elements need be controlled by the shift valves.

If an arrangement is made that the first shift valve controls a condition of communication between an oil supply passage which is in communication with the hydraulic oil pressure source and a first oil passage and a second oil passage which are both on the downstream side of the oil supply passage, that a second shift valve controls the condition of communication between the first oil passage and a third oil passage which is on the downstream side of the first oil passage and also controls the condition of communication between the second oil passage and a fourth oil passage and a fifth oil passage which are both on the downstream side of the second oil passage, and that the third shift valve controls the condition of communication between the fifth oil passage and a sixth oil passage and a seventh oil passage which are both on the downstream side of the fifth oil passage, and if further arrangement is made that the second hydraulic engaging element is connected to the third oil passage, that the third hydraulic engaging element is connected to the fourth oil passage, that the fourth hydraulic engaging element is connected to the sixth oil passage and that the fifth hydraulic engaging element is connected to the seventh oil passage, respectively, the following becomes possible. Namely, the oil supply passage is communicated with the first oil passage by the first shift valve, and the first oil passage is communicated with the third oil passage by the second shift valve. The second transmission train is thus established by feeding the hydraulic oil to the second hydraulic engaging element. From this condition, by changing over the first shift valve, the oil supply passage is communicated with the second oil passage and the second oil passage is communicated with the fourth oil passage via the second shift valve. The hydraulic oil is thus supplied to the third hydraulic engaging element, thereby establishing the third-speed transmission train. From this condition, by changing over the second shift valve, the second oil passage is communicated with the fifth oil passage and the fifth oil passage is made to be communicated with the sixth oil passage via the third shift valve. The hydraulic oil is thus supplied to the fourth hydraulic engaging element, thereby establishing the fourth-speed transmission train. From this condition, by changing over the third shift valve, the fifth oil passage is communicated with the seventh oil passage. The hydraulic oil is thus supplied to the fifth hydraulic engaging element, thereby establishing the fifth-transmission train.

By the way, the hydraulic oil circuit is provided with a manual valve. In this case, if an arrangement is made such that in a first changeover position of the manual valve an upstream portion and a downstream portion of the fifth oil passage are communicated with each other and in a second changeover position thereof the upstream portion and the downstream portion of the fifth oil passage are closed to communication with each other and the upstream portion is communicated with an eighth oil passage, and in that changeover position of the second shift valve which allows for communication of the second oil passage and the fifth oil passage the eighth oil passage and the third oil passage are communicated with each other, there is the following advantage. Namely, even in case of a failure in which both the first shift valve and the second shift valve are restrained to the changeover position on the high speed side, a strong driving force can be obtained by establishing the second-speed transmission train in the second changeover position of the manual valve.

Further, if an arrangement is made such that in that changeover position of the second shift valve which closes the communication between the first oil passage and the third oil passage the first oil passage is communicated with a ninth oil passage, that in a third changeover position of the manual valve the upstream portion and the downstream portion of the fifth oil passage are closed to communication with each other and the upstream portion is communicated with the eighth oil passage and in the third changeover position the ninth oil passage is communicated with a tenth oil passage, and to the tenth oil passage a sixth hydraulic engaging element provided in parallel with the first hydraulic engaging element is connected, the following is possible. Namely, by engaging the sixth hydraulic engaging element in the third changeover position of the manual valve, the first-speed transmission train can be established in a condition in which overrunning on the output side is not allowed, i.e., in a condition in which the engine braking can be applied. The second-speed transmission train can also be established by the changeover of the first shift valve. When the manual valve is changed over to the third changeover position at the time of running at a high speed, it advantageously becomes possible to establish the second-speed transmission train first and then downshift to the first speed transmission train.

By the way, it is possible to control to independently change over the first shift valve, the second shift valve and the third shift valve respectively by the first solenoid valve, the second solenoid valve and the third solenoid valve. However, if an arrangement is made such that the changeover of the first shift valve is controlled by the first solenoid valve and the third solenoid valve, and the changeover of the second shift valve is controlled by the second solenoid valve and the third solenoid valve, and the changeover of the third shift valve is controlled by the third solenoid valve, it is advantageous from the fail-safe point of view.

In other words, it is preferable to provide a measure against the sticking of the first shift valve and the second shift valve which are on the upstream side. In this case, if an arrangement is made such that the hydraulic oil pressure to be controlled by the first and the second solenoid valves is caused to be applied to one end of each of the above-described shift valves and the hydraulic oil pressure to be controlled by the third solenoid valve to the other end thereof, each of the shift valves can be urged by the hydraulic oil pressure to one side and the other side of the changeover positions. The occurrence of valve stick can thus be prevented to the best extent possible.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
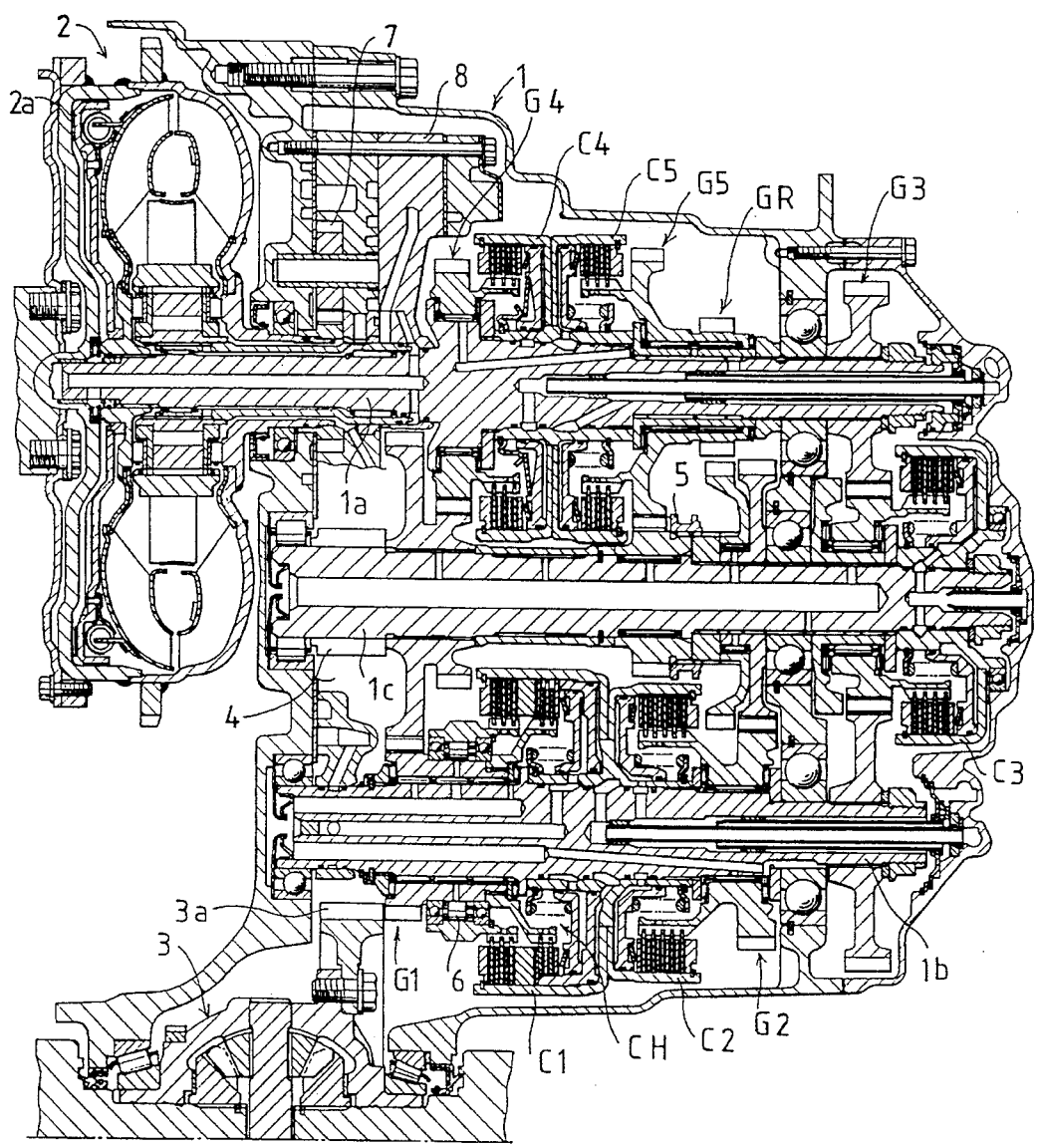
FIG. 1 is a developed sectional view of an example of a transmission to which the present invention is applied.

Referring to FIG. 1, numeral 1 denotes a transmission for effecting the changing or shifting of the speed of a vehicle such as an automobile to five forward speeds and one reverse speed. This transmission 1 comprises a first input shaft $1a$ which is connected to an engine via a fluid torque converter 2 having a clutch $2a$, a second input shaft $1b$ which is rotated synchronously with the first input shaft $1a$, and an output shaft $1c$ which has an output gear 4 to be meshed with an input gear $3a$ of a differential gear 3. Between the second input shaft $1b$ and the output shaft $1c$ there are parallelly disposed transmission trains G1 and G2 for forward first speed and second speed, respectively. Between the first input shaft $1a$ and the output shaft $1c$ there are parallelly disposed transmission trains G3, G4, G5 for forward third speed through fifth speed, respectively, as well as a reverse transmission train GR. In these forward transmission trains there are interposed hydraulic engaging elements in the form of first-speed through fifth-speed hydraulic clutches C1, C2, C3, C4, C5, respectively, so that each of the forward transmission trains can be selectively established through engagement of each of the hydraulic clutches. The reverse transmission train GR is arranged to share the fifth-speed hydraulic clutch C5 with the fifth-speed transmission train G5 so that the fifth-speed transmission train G5 and the reverse transmission train GR can be selectively established by the changeover of a selector gear 5 on the output shaft $1c$ between the forward position on the left-hand side of the drawing and the reverse position on the right-hand side of the drawing. In the reverse transmission train GR there is interposed an unillustrated idle gear. In addition, the third-speed hydraulic clutch C3 is mounted on an end portion of the output shaft 1c so that the second input shaft 1b can be synchronously rotated with the first input shaft 1a via a gear train for the third-speed transmission train G3 on the input side of the hydraulic clutch C3 and a gear which is fixed to the second input shaft 1b and meshes with the gear train.

In the first-speed transmission train G1 there is provided a one-way clutch 6 which is interposed between the first-speed hydraulic clutch C1 and a gear train, on the output side thereof, for the first-speed transmission train G1 and which is a one-way transmission mechanism for allowing the overrunning of the output side. Furthermore, inside the first-speed hydraulic clutch C1 there is assembled a first-speed holding hydraulic clutch CH whose output side is directly connected to the gear train for the first-speed transmission train G1. The first-speed transmission train G1 can thus be established in a condition in which the overrunning of the output side is not allowed by the engagement of the hydraulic clutch CH, i.e., in a condition in which an engine braking can be applied.

Inside the casing of the transmission 1 there is provided a valve block 8 which has assembled therein a pump 7 as a hydraulic oil pressure source and various valves. Supplying and discharging of hydraulic oil to each of the above-described hydraulic clutches are arranged to be controlled by a hydraulic oil pressure control circuit which is made up of the various valves assembled in the valve block 8.

Figure 2:
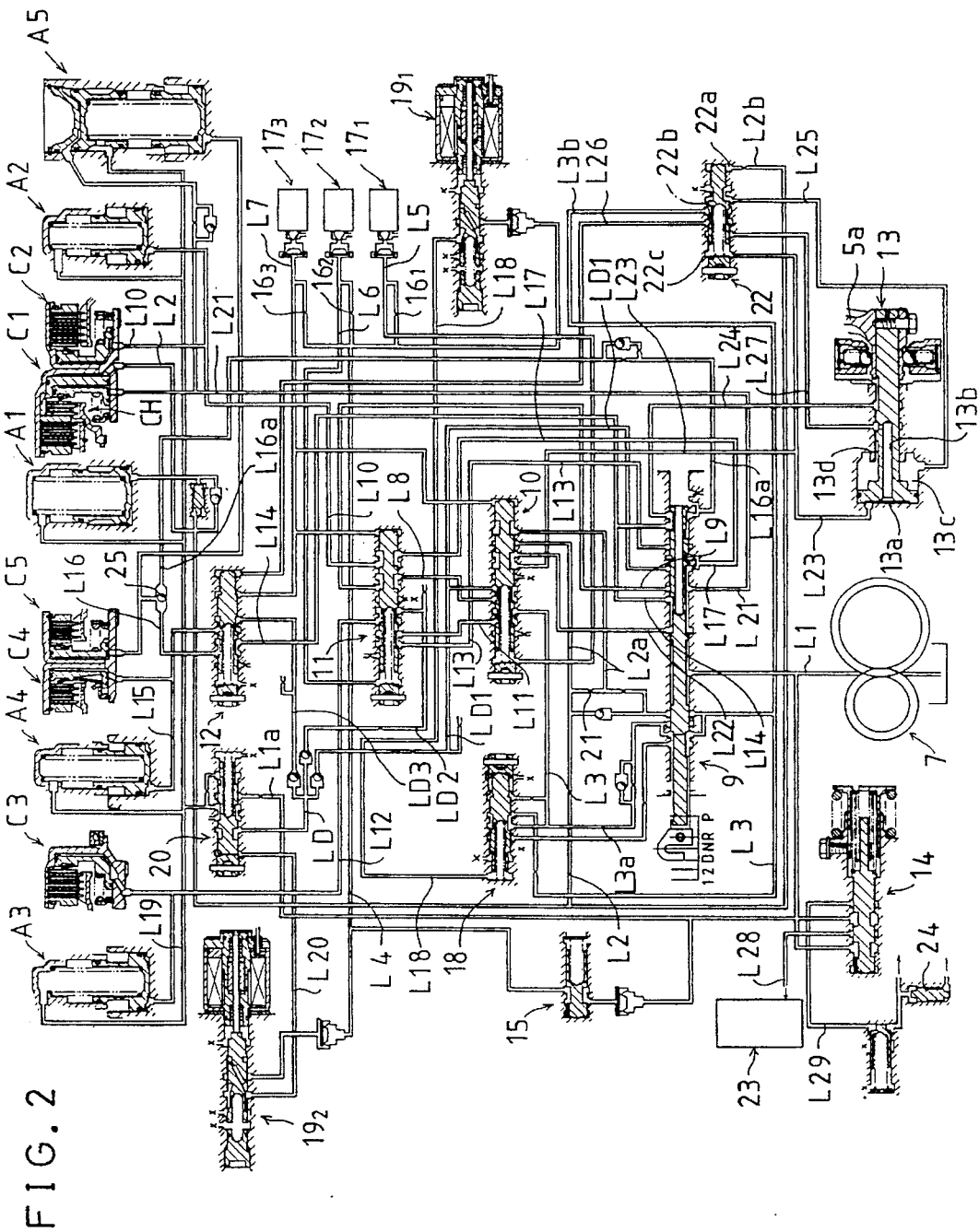
FIG. 2 is a circuit diagram showing the hydraulic control circuit thereof.
Figure 3:
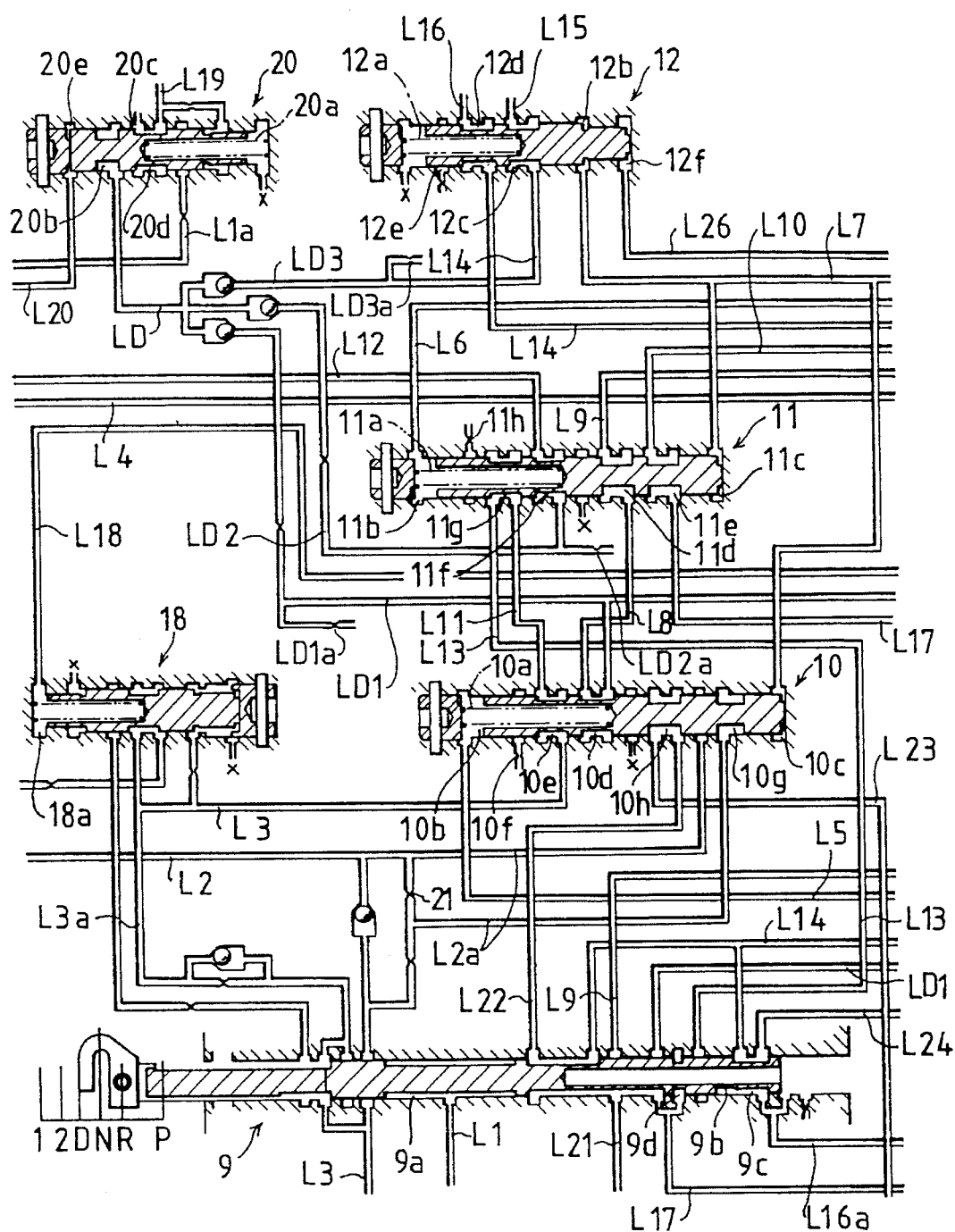
FIG. 3 is an enlarged view of an important portion of the circuit diagram of FIG. 2.

As shown in FIGS. 2 and 3, the hydraulic oil pressure control circuit is provided with a manual valve 9 which can be operated for changing over among a total of six positions of "P" for parking, "R" for reverse running, "N" for neutral, "D" for automatic speed changing, "2" for holding the second speed, and "1" for holding the first speed, three sets of No. 1 through No. 3 shift valves 10, 11, 12, and a servo valve 13, to which is connected a shift fork 5a of the selector gear 5, for changing over between forward and reverse running. In the "D" position of the manual valve 9, No. 1 oil passage L1 which is in communication with the oil pump 7 is connected to No. 2 oil passage L2 which is in communication with the first-speed hydraulic clutch C1 and to No. 3 oil passage L3 which is in communication with No. 1 shift valve 10 via an annular groove 9a of the manual valve 9. Pressurized oil which is adjusted by a regulator valve 14 to a constant line pressure is supplied from No. 1 oil passage L1 to No. 2 and No. 3 oil passages L2, L3 and, consequently, the hydraulic oil supply can be made to the first-speed hydraulic clutch C1 and to the second-speed through the fifth-speed hydraulic clutches C2, C3, C4, C5 via No. 1 through No. 3 shift valves 10, 11, 12.

The above-described shift valves 10, 11, 12 are respectively so arranged as to be able to be changed over against respective springs 10a, 11a, 12a from the right-hand side position to the left-hand side position. A modulator pressure (a constant pressure which is lower than the line pressure) from a modulator valve 15 which is connected to No. 1 oil passage L1 is arranged to be inputted into an oil chamber 10b on the left end of No. 1 shift valve 10 via No. 5 oil passage L5 which is in communication, via an orifice $16_1$, with No. 4 oil passage L4 on the output side of the modulator valve 15, as well as to an oil chamber 11b on the left end of No. 2 shift valve 11 via No. 6 oil passage L6 which is in communication, via an orifice $16_2$, with No. 4 oil passage L4. The modulator pressure is also arranged to be inputted to an oil chamber 12b on the right-hand side of No. 3 shift valve 12 via No. 7 oil passage L7 which is in communication, via an orifice $16_3$, with No. 4 oil passage L4, as well as to oil chambers 10c, 11c on the right ends of No. 1 and No. 2 shift valves 10, 11 respectively. To these No. 5 through No. 7 oil passages L5, L6, L7 there are respectively connected No. 1 through No. 3 normally-closed type solenoid valves $17_1$, $17_2$, $17_3$ which respectively open the oil passages to the atmosphere. These solenoid valves $17_1$, $17_2$, $17_3$ can thus be controlled to be opened or closed by an unillustrated electronic control circuit comprising a microcomputer or the like so that No. 1 through No. 3 shift valves 10, 11, 12 can be changed over in response to each of the transmission trains as described hereinbelow.

Namely, at the first speed, No. 1 solenoid valve $17_1$ is opened and No. 2 and No. 3 solenoid valves $17_2$, $17_3$ are closed. According to this operation, the modulator pressure is inputted to the oil chamber 10c on the right end of No. 1 shift valve 10, and No. 1 shift valve 10 is consequently changed over to the left-hand side position. The modulator pressure is also inputted to the oil chambers 11b, 11c on the left end and the right end, respectively, of No. 2 shift valve 11 to thereby cause the right and the left urging forces by the modulator pressure to be well balanced. As a result, No. 2 shift valve 11 is changed over to the right-hand side position by means of the spring 11a. In this condition, No. 3 oil passage L3 is connected to No. 8 oil passage L8 via an annular groove 10d of No. 1 shift valve 10, and No. 8 oil passage L8 is connected to No. 9 oil passage L9 via an annular groove 11d of No. 2 shift valve 11. However, since the downstream end of No. 9 oil passage L9 is blocked by the manual valve 9 in the "D" position thereof, no hydraulic oil is supplied to the second-speed through the fifth-speed hydraulic clutches C2 through C5 but is supplied only to the first-speed hydraulic clutch C1, thereby establishing the first-speed transmission train G1.

At the second speed, No. 2 solenoid valve $17_2$ is opened from the above-described condition. According to this operation, the supply of the modulator pressure to the oil chamber 11b on the left end of No. 2 shift valve 11 is stopped, with the result that No. 2 shift valve 11 is changed over to the left-hand side position. In this condition, No. 8 oil passage L8 is connected to No. 10 oil passage L10, which is in communication with the second-speed hydraulic clutch C2, via an annular groove 11e of No. 2 shift valve 11. The hydraulic oil is therefore supplied to the second-speed hydraulic clutch C2 to thereby establish the second-speed transmission train G2. In this case, through the operation of the above-described one-way clutch 6, the power transmission via the first-speed transmission train G1 is automatically stopped.

At the third speed, No. 1 solenoid valve $17_1$ is closed from the condition of the second speed. According to this operation, the modulator pressure is supplied to the oil chamber 10b on the left end of No. 1 shift valve 10, so that No. 1 shift valve 10 is changed over to the right-hand side position. In this condition, No. 3 oil passage L3 is connected to No. 11 oil passage L11 via an annular groove 10e of No. 1 shift valve 10, and No. 11 oil passage L11 is connected to No. 12 oil passage L12, which is in communication with the third-speed hydraulic clutch C3, via an annular groove 11f of No. 2 shift valve 11 which is in the left-hand side position, thereby supplying the hydraulic oil to the third-speed hydraulic clutch C3. On the other hand, No. 8 oil passage L8 which is connected to No. 10 oil passage L10 in communication with the second-speed hydraulic clutch C2 is connected, via an annular groove 10d of No. 1 shift valve 10, to No. 1 oil discharge passage LD1 so as to discharge the hydraulic oil from the second-speed hydraulic clutch C2, thereby establishing the third-speed transmission train G3.

At the fourth speed, No. 2 solenoid valve $17_2$ is closed from the condition of the third speed. According to this operation, the modulator pressure is inputted to the oil chamber 11b on the left end of No. 2 shift valve 11 so as to change over No. 2 shift valve 11 to the right-hand side position. In this condition, No. 11 oil passage L11 is connected to No. 13 oil passage L13 via an annular groove 11g of No. 2 shift valve 11. No. 14 oil passage L14 which is connected, in the "D" position of the manual valve 9, to No. 13 oil passage L13 via a notched groove 9b and an annular groove 9c of the manual valve 9 is connected, via an annular groove 12c of No. 3 shift valve 12 which is in the left-hand side position, to No. 15 oil passage L15 which is in communication with the fourth-speed hydraulic clutch C4. The hydraulic oil is thus supplied to the fourth-speed hydraulic clutch C4. On the other hand, No. 12 oil passage L12 which is in communication with the third-speed hydraulic clutch C3 is connected to No. 2 oil discharge passage LD2 via an annular groove 11f of No. 2 shift valve 11 so as to discharge the hydraulic oil from the third-speed hydraulic clutch C3, thereby establishing the fourth-speed transmission train G4.

At the fifth speed, No. 3 solenoid valve $17_3$ is opened from the condition of the fourth speed. According to this operation, the supply of the modulator pressure to the oil chamber 12b of No. 3 shift valve 12 is stopped and, consequently, No. 3 shift valve 12 is changed over to the right-hand side position by means of the spring 12a. In this condition, No. 14 oil passage L14 is connected, via an annular groove 12d of No. 3 shift valve 12, to No. 16 oil passage L16 which is in communication with the fifth-speed hydraulic clutch C5, thereby supplying the hydraulic oil to the fifth-speed hydraulic clutch C5. On the other hand, No. 15 oil passage L15 which is in communication with the fourth-speed hydraulic clutch C4 is connected to No. 3 oil discharge passage LD3 via the annular groove 12c of No. 3 shift valve 12 so as to discharge the hydraulic oil from the fourth-speed clutch C4, thereby establishing the fifth-speed transmission train G5.

At the time of downshifting from the fifth speed to the fourth speed, No. 16 oil passage L16 is connected to an oil discharge port 12e via the annular groove 12d of No. 3 shift valve 12 that is in the left-hand side position, thereby discharging the hydraulic oil from the fifth-speed hydraulic clutch C5. At the time of downshifting from the fourth speed to the third speed, No. 13 oil passage L13 that is connected via No. 14 oil passage L14 to No. 15 oil passage L15 is connected to an oil discharge port 11h via an annular groove 11g of No. 2 shift valve 11 that is in the left-hand side position, thereby discharging the hydraulic oil from the fourth-speed clutch C4. At the time of downshifting from the third speed to the second speed, No. 11 oil passage L11 that is connected to No. 12 oil passage L12 via an annular groove 11f of No. 2 shift valve 11 that is in the left-hand side position is connected, via the annular groove 10e of No. 1 shift valve 10 that is in the left-hand side, to an oil discharge port 10f, thereby discharging the hydraulic oil from the third-speed hydraulic clutch C3. At the time of downshifting from the second speed to the first speed, No. 17 oil passage L17 that is connected, in the "D" position of the manual valve 9, to No. 1 oil discharge passage LD1 via the annular groove 9d of the manual valve 9 is connected, via the annular groove 11e of No. 2 shift valve 11 that is in the right-hand side position, to No. 10 oil passage L10 so as to discharge the hydraulic oil from the second-speed hydraulic clutch C2.

The opening and closing of the solenoid valves $17_1$, $17_2$, $17_3$ and the changeover positions of the shift valves 10, 11, 12 at each transmission train can be summarized as shown in the following Table 1.

TABLE 1

|  | No. 1 solenoid valve | No. 2 solenoid valve | No. 3 solenoid valve | No. 1 shift valve | No. 2 shift valve | No. 3 shift valve |
| --- | --- | --- | --- | --- | --- | --- |
| First speed | open | closed | closed | left | right | left |
| Second speed | open | open | closed | left | left | left |
| Third speed | closed | open | closed | right | left | left |
| Fourth speed | closed | closed | closed | right | right | left |
| Fifth speed | closed | closed | open | right | right | right |

By the way, the following arrangement may also be employed. Namely, the left end oil chambers 10b, 11b of No. 1 shift valve 10 and No. 2 shift valve 11, respectively, are opened to atmosphere and the hydraulic oil pressure of No. 5 oil passage L5 and No. 6 oil passage L6 are respectively inputted to the right end oil chambers 10c, 11c of No. 1 shift valve 10 and No. 2 shift valve 11, to thereby control to change over No. 1 shift valve 10 and No. 2 shift valve 11 only by the solenoid valves $17_1$, $17_2$. In this case, however, when there should occur valve sticking of No. 1 shift valve 10 or No. 2 shift valve 11 in its left-hand side position by inclusion of foreign matters therein, or the like with the result that No. 1 shift valve 10 or No. 2 shift valve 11 can no longer be changed over to the right-hand side position by the urging force of the spring 10a, 11a, there can be established only the first-speed transmission train G1 and the second-sped transmission train G2. On the other hand, according to the above-described embodiment, there is the following advantage. Namely, when No. 3 solenoid valve $17_3$ is opened and No. 1 and No. 2 solenoid valves $17_1$, $17_2$ are closed in the fifth-speed condition, No. 1 and No. 2 shift valves 10, 11 are strongly urged to the right by the hydraulic pressure in addition to the spring force. The valve sticking is consequently released and No. 1 and No. 2 shift valves 10, 11 can thus be able to be changed over to the right-hand side position.

There is interposed in No. 3 oil passage L3 a pressure regulator valve 18. An output pressure from No. 1 solenoid proportional valve $19_1$ which is connected to No. 4 oil passage L4 on the output side of the modulator valve 15 is inputted, via No. 18 oil passage L18, to an oil chamber 18a on the left end of the pressure regulator valve 18. It is thus so arranged that, at the time of shifting the speed, the pressure rise characteristics of a hydraulic clutch to be engaged are controlled by No. 1 solenoid proportional valve $19_1$ via the pressure regulator valve 18 to prevent the occurrence of speed-change shocks.

In the drawings, numerals A1, A2, A3, A4, A5 denote accumulators which are provided to alleviate sudden pressure changes in the first-speed through the fifth-speed hydraulic clutches C1, C2, C3, C4, C5. Numeral 20 denotes a discharge oil control valve to which No. 1 through No. 3 discharge oil passages LD1, LD2, LD3 are connected after combining them into one. When the discharge oil control valve 20 is moved to the right against a spring 20a, a combined discharge oil passage LD is connected, via an annular groove 20b of the discharge oil control valve 20, to an oil discharge port 20c. Also, a branch oil passage L1a of No. 1 oil passage L1 is connected, via an annular groove 20d of the discharge oil control valve 20, to No. 19 oil passage L19 which is in communication with back pressure chambers of the above-described accumulators A1 through A5 so that the line pressure can be inputted to the back pressure chambers. To an oil chamber 20e on the left end of the discharge oil control valve 20, there is inputted, via No. 20 oil passage L20, an output pressure from No. 2 solenoid proportional valve $19_2$ which is in communication with No. 4 oil passage L4. At the time of speed changing, the hydraulic oil pressure in No. 19 oil passage L19, i.e., the back pressure of the accumulators A1 through A5, is controlled by No. 2 solenoid proportional valve $19_2$ via the discharge oil control valve 20. The pressure drop characteristics of a hydraulic clutch to be disengaged are thus controlled so that a suitable simultaneous engagement with another hydraulic clutch to be engaged takes place. Thereafter, when the hydraulic clutch to be engaged has substantially been engaged, the discharge oil control valve 20 is pushed to the right utmost end. In order for the hydraulic oil to be thereby discharged also from the oil discharge port 20c in addition to each of the oil discharge ports LD1a, LD2a, LD3a with orifices of No. 1 through No. 3 oil discharge passages $LD_1$, $LD_2$, $LD_3$, the combined oil discharge passage LD is caused to be in communication with the oil discharge port 20c so as to decrease the oil discharging resistance of the hydraulic clutch to be disengaged. The back pressure of the accumulators is also increased to the line pressure to force out the hydraulic oil remaining in the oil passages of a hydraulic clutch to be disengaged. In this manner, the hydraulic pressure of the hydraulic clutch to be disengaged is arranged to be quickly decreased.

In addition, in order to alleviate the gear-in shocks or shocks at the time of gear engagement, a squat control is made such that, at the time of gearing in for starting by changing over the manual valve 9 from the "P" or "N" position to the "D" position, No. 1 shift valve 10 is moved to the right-hand side position and No. 2 shift valve 11 to the left-hand side position, thereby once establishing the third-speed transmission train G3. Thereafter, No. 1 shift valve 10 is changed over to the left-hand side position and No. 2 shift valve 11 to the right-hand side position, thereby establishing the first-speed transmission train G1. At this time, in order to surely attain the torque transmission by the third-speed transmission train G3, it is necessary to prevent the hydraulic oil pressure of the first-speed hydraulic clutch C1 from rising earlier than that of the third-speed hydraulic clutch C3. For that purpose, there is provided a small-diameter orifice 21 in No. 2 oil passage L2. Furthermore, in order for the hydraulic oil pressure in the first-speed hydraulic clutch C1 to quickly rise at the time of downshifting from the third speed to the first speed, there is provided in No. 2 oil passage L2 a bypass oil passage L2a which is in parallel with the orifice 21 so that, by changing over No. 1 shift valve 10 to the left-hand side position, the bypass passage L2a can be opened via an annular groove 10g of No. 1 shift valve 10.

In the "2" position of the manual valve 9, No. 1 oil passage L1 is connected, via the annular groove 9a of the manual valve 9, to No. 2 oil passage L2 and No. 3 oil passage L3 and also to the bypass passage L3a which is in communication with the downstream side of No. 3 oil passage L3, so that the line pressure is inputted to No. 1 shift valve 10 without passing through the pressure regulator valve 18. Further, the communication is cut off between No. 13 oil passage L13 and No. 14 oil passage L14 which connect No. 2 shift valve 11 and No. 3 shift valve 12, and No. 13 oil passage L13 is connected to No. 17 oil passage L17 via the annular groove 9c and the notched groove 9b of the manual valve 9. Here, in the "2" position, No. 1 solenoid valve $17_1$ and No. 2 solenoid valve $17_2$ are both closed to thereby change over No. 1 shift valve 10 and No. 2 shift valve 11 to the right-hand side position. According to this operation, No. 3 oil passage L3 is connected to No. 10 oil passage L10 via No. 11 oil passage L11, No. 13 oil passage L13, and No. 17 oil passage L17, whereby the hydraulic oil is supplied to the second-speed hydraulic clutch C2 to establish the second-speed transmission train G2. According to this arrangement, even if No. 1 shift valve 10 and No. 2 shift valve 11 were restrained, through a failure of the solenoid valves $17_1$, $17_2$, $17_3$, valve stick or the like, to a condition in which No. 1 shift valve 10 and No. 2 shift valve 11 are both positioned in the right-hand side position (i.e., a condition of the fourth speed or the fifth speed in the "D" position), a strong driving power can advantageously be obtained by establishing the second-speed transmission train G2 by positioning the manual valve 9 in the "2" position.

When a sudden downshifting is made, while running at a high speed in the "D" position, to the second-speed transmission train G2 by changing over to the "2" position, overrunning of the engine or large shifting shocks may sometimes occur. As a solution, the following arrangement has been made. Namely, when a changeover has been made to the "2" position at above a predetermined vehicle speed, No. 1 solenoid valve $17_1$ and No. 3 solenoid valve $17_3$ are both closed, and No. 2 solenoid valve $17_2$ is opened so as to change over No. 1 shift valve 10 to the right-hand side position and No. 2 shift valve 11 to the left-hand side position. No. 3 oil passage L3 is thus connected to No. 12 oil passage L12 via No. 11 oil passage L11 to supply the hydraulic oil to the third-speed hydraulic clutch C3, thereby establishing the third-speed transmission train G3. Once the vehicle speed has been decreased below a predetermined speed, No. 2 solenoid valve $17_2$ is closed to change over No. 2 shift valve 11 to the right-hand side position, thereby establishing the second-speed transmission train G2.

In the "1" position of the manual valve 9, while No. 1 oil passage L1 is connected, via the annular groove 9a of the manual valve 9, to No. 2 oil passage L2, No. 3 oil passage L3 and the bypass passage L3a, as in the "2" position, No. 13 oil passage L13 and No. 17 oil passage L17 are connected together via the annular groove 9c of the manual valve 9. Furthermore, No. 9 oil passage L9 on the downstream side of No. 2 shift valve 11 is connected, via the annular groove 9d of the manual valve 9, to No. 21 oil passage L21 which is in communication with the first-speed holding hydraulic clutch CH. Here, in the "1" position, No. 1 solenoid valve $17_1$ is opened and No. 2 solenoid valve $17_2$ and No. 3 solenoid valve $17_3$ are closed to thereby change over No. 1 shift valve 10 to the left-hand side position and No. 2 shift valve 11 to the right-hand side position. According to this operation, No. 3 oil passage L3 is connected to No. 21 oil passage L21 via No. 8 oil passage L8 and No. 9 oil passage L9. As a result, the hydraulic oil is supplied to the first-speed holding clutch CH so as to establish the first-speed transmission train G1 in a condition in which engine braking can be applied. When changeover is made to the "1" position at a vehicle speed above a predetermined speed, No. 1 solenoid valve $17_1$ and No. 2 solenoid valve $17_2$ are both closed to change over No. 1 shift valve 10 and No. 2 shift valve 11 both to the right-hand side position. Thus, like at the above-described second speed in the "2" position, No. 3 oil passage L3 is connected to No. 10 oil passage L10 via No. 11 oil passage L11, No. 13 oil passage L13, and No. 17 oil passage L17 to supply the hydraulic oil to the second-speed hydraulic clutch C2, thereby establishing the second-speed transmission train G2. When the vehicle speed has been decreased below a predetermined speed, No. 1 shift valve 10 is changed over, as described above, to the left-hand side position to establish the first-speed transmission train G1.

In the "R" position of the manual valve 9, No. 1 oil passage L1 is connected, via the annular groove 9a of the manual valve 9, to No. 22 oil passage L22 which is in communication with No. 1 shift valve 10. In this case, No. 1 shift valve 10 is changed over to the right-hand side position by the closing operation of No. 1 solenoid valve $17_1$, so that No. 22 oil passage L22 is connected, via an annular groove 10h of No. 1 shift valve 10, to No. 23 oil passage L23 which is in communication with the left end oil chamber 13a of the servo valve 13. According to this operation, the servo valve 13 is moved to the right by the line pressure which is inputted via No. 23 oil passage L23, whereby the selector gear 5 is changed over to the reverse position on the right-hand side position. In the reverse position, No. 23 oil passage L23 is connected, via an axial bore 13b of the servo valve 13 which is in communication with the oil chamber 13a, to No. 24 oil passage L24 which is in communication with the manual valve 9. No. 24 oil passage L24 is so arranged as to be connected, via the annular groove 9c of the manual valve 9 in the "R" position thereof, to a branch oil passage L16a which is branched via a shuttle valve 25 from No. 16 oil passage L16 which is in communication with the fifth-speed hydraulic clutch C5. Thus, the reverse transmission train GR is established by the changing over of the selector gear 5 to the reverse position and the supplying of the hydraulic oil to the fifth-speed hydraulic clutch C5.

When the manual valve 9 is changed over from the "R" position to the forward running position of "D", "2" or "1", the line pressure is inputted to an oil chamber 13c on the right-hand side of the servo valve 13 via the branch oil passage L3b which is branched from an upstream portion of No. 3 oil passage L3, the servo control valve 22 and No. 25 oil passage L25. The selector gear 5 is thus moved to the left to change over the selector gear 5 to the forward running position on the left-hand side position. In this case, if the changing over is made from the "R3" position to "D", "2" or "1" position in a condition in which the wheels are slipping, the selector gear 5 sometimes moves to the left from the reverse position while the output shaft 1c is still running through inertia in the opposite direction, with the result that the changing over to the forward running position cannot be made smoothly. As a solution, the following arrangement has been made. Namely, the hydraulic oil pressure of the first-speed hydraulic clutch C1 is caused to be applied, via a branch oil passage L2b of No. 2 oil passage L2, to the right end of the servo control valve 22. Thus, when the hydraulic oil pressure in the first-speed hydraulic clutch C1 has increased to a certain degree and, consequently, the reverse rotation of the output shaft 1c has been restricted or braked by the engaging force of the first-speed hydraulic clutch C1, the servo control valve 22 is moved to the left to thereby connect the branch oil passage L3b to No. 25 oil passage L25, whereby the servo valve 13 is moved to the left. Further, the hydraulic oil pressure in No. 23 oil passage L23 is caused to be applied to the left end of the servo control valve 22 so that the servo control valve 22 can positively be returned to the right-hand side position at the time of reverse running. Further, there are provided No. 26 oil passage L26 which is in communication with the right end oil chamber 12f of No. 3 shift valve 12 and No. 27 oil passage L27 which, in the reverse position of the servo valve 13, is in communication with the right side oil chamber 13c of the servo valve 13 via a notched groove 13d thereof. No. 26 oil passage L26 is arranged to be changed over, in the right-hand side position of the servo control valve 22, to the branch oil passage L3b and, in the left-hand side position thereof, to No. 27 oil passage L27. According to this arrangement, if the selector gear 5 will not be changed over to the forward position because, when the manual valve 9 is changed over from the "R" position to the "D" position, the servo control valve 22 is restrained to the right-hand side position or because the servo valve 13 is restrained to the reverse position even if the servo control valve 22 has been changed over to the left-hand side position, the line pressure is inputted to the right end oil chamber 12f of No. 3 shift valve 12 from the branch oil passage L3b or from No. 27 oil passage L27 via No. 26 oil passage L26. As a result, No. 3 shift valve 12 is forcibly changed over to the left-hand side position, so that the hydraulic oil cannot be supplied to the fifth-speed hydraulic clutch C5, thereby inhibiting the establishment of the reverse transmission train GR in the "D" position.

In the "N" position of the manual valve 9, the communication is cut off between No. 1 oil passage L1 and the remaining oil passages. In the "P" position, No. 1 oil passage L1 is connected to No. 22 oil passage L22 to move No. 1 shift valve 10 to the left-hand side position. Consequently, No. 22 oil passage L22 is connected to No. 23 oil passage L23 to change over the servo valve 13 to the reverse position. In the "P" position, however, No. 24 oil passage L24 is not connected to the branch oil passage L16a and, therefore, the reverse transmission train GR is not established.

In the drawings, numeral 23 denotes a hydraulic control circuit for the clutch 2a for the fluid torque converter 2. This control circuit regulates the hydraulic clutch 2a by supplying the working hydraulic oil to be supplied from the regulator valve 14 via No. 28 oil passage L28 in the direction of engaging the clutch or in the direction of disengaging it.

Surplus oil that is discharged from the regulator valve 14 to No. 29 oil passage L29 is supplied to the lubricating portions around the first input shaft 1a and the lubricating portions around the second input shaft 1b and the output shaft 1c via the chalk type throttle 24.

As can be seen from the above description, according to the present invention, speed changing of five transmission trains or more can be made with three shift valves. Therefore, the number of the shift valves to be used can be decreased and the transmission can be made small in size and light in weight.

It is readily apparent that the above-described hydraulic control circuit meets all of the objects mentioned above and also has the advantage of wide commercial utility. It should be understood that the specific form of the invention hereinabove described is intended to be representative only, as certain modification within the scope of these teachings will be apparent to those skilled in the art.

Accordingly, reference should be made to the following claims in determining the full scope of the invention.

What is claimed is:

1. A hydraulic control circuit for a hydraulically operated vehicular transmission having at least five forward transmission trains, said hydraulic control circuit comprising:

three sets of first through third shift valves; and first through fifth hydraulic engaging elements;

wherein said first shift valve controls a condition of communication between an oil supply passage which is in communication with a hydraulic oil pressure source and a first oil passage and a second oil passage which are both on a downstream side of said oil supply passage, wherein said second shift valve controls a condition of communication between said first oil passage and a third oil passage which is on a downstream side of said first oil passage and also controls a condition of communication between said second oil passage and a fourth oil passage and a fifth oil passage which are both on a downstream side of said second oil passage, and wherein said third shift valve controls a condition of communication between said fifth oil passage and a sixth oil passage and a seventh oil passage which are both on a downstream side of said fifth oil passage; and wherein said first hydraulic engaging element is provided with a one-way transmission mechanism for allowing overrunning of an output side, said first hydraulic engaging element being connected to said hydraulic oil pressure source without passing through said first through third shift valves, said second hydraulic engaging element being connected to said third oil passage, said third hydraulic engaging element being connected to said fourth oil passage, said fourth hydraulic engaging element being connected to said sixth oil passage and said fifth hydraulic engaging element being connected to said seventh oil passage, respectively.

2. A hydraulic control circuit according to claim 1, further comprising a manual valve, wherein in a first changeover position of said manual valve an upstream portion and a downstream portion of said fifth oil passage are communicated with each other and in a second changeover position thereof said upstream portion and said downstream portion of said fifth oil passage are closed to communication with each other and said upstream portion is communicated with an eighth oil passage, and wherein in that change over position of said second shift valve which allows for communication of said second oil passage and said fifth oil passage said eighth oil passage and said third oil passage are communicated with each other.

3. A hydraulic control circuit according to claim 2, wherein in that changeover position of said second shift valve which closes the communication between said first oil passage and said third oil passage, said first oil passage is communicated with a ninth oil passage, and wherein in a third changeover position of said manual valve said upstream portion and said downstream portion of said fifth oil passage are closed to communication with each other and said upstream portion is communicated with said eighth oil passage and in said third changeover position said ninth oil passage is communicated with a tenth oil passage, and to said tenth oil passage a sixth hydraulic engaging element provided in parallel with said first hydraulic engaging element is connected.

4. A hydraulic control circuit according to any one of claims 1, 2 and 3, wherein changeover of said first shift valve is controlled by a first solenoid valve and a third solenoid valve, changeover of said second shift valve is controlled by a second solenoid valve and said third solenoid valve, and changeover of said third shift valve is controlled by said third solenoid valve.

* * * * *